United States Patent
Fu et al.

(10) Patent No.: US 12,368,706 B2
(45) Date of Patent: Jul. 22, 2025

(54) PRIVACY PROTECTION FOR SIDELINK COMMUNICATIONS

(71) Applicant: Telefonaktiebolaget LM Ericsson (publ), Stockholm (SE)

(72) Inventors: Zhang Fu, Stockholm (SE); Markus Hanhisalo, Espoo (FI); Shabnam Sultana, Montreal (CA); Noamen Ben Henda, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 350 days.

(21) Appl. No.: 17/800,035

(22) PCT Filed: Feb. 5, 2021

(86) PCT No.: PCT/EP2021/052795
§ 371 (c)(1),
(2) Date: Aug. 16, 2022

(87) PCT Pub. No.: WO2021/165056
PCT Pub. Date: Aug. 26, 2021

(65) Prior Publication Data
US 2023/0073658 A1   Mar. 9, 2023

Related U.S. Application Data

(60) Provisional application No. 62/979,563, filed on Feb. 21, 2020.

(51) Int. Cl.
*H04L 9/40* (2022.01)

(52) U.S. Cl.
CPC ................ *H04L 63/083* (2013.01)

(58) Field of Classification Search
CPC ..................................... H04L 63/083
See application file for complete search history.

(56) References Cited

U.S. PATENT DOCUMENTS

| | | | |
|---|---|---|---|
| 6,889,246 B1 * | 5/2005 | Kawamoto | H04L 63/104 709/215 |
| 9,628,956 B1 * | 4/2017 | Kim | H04W 4/023 |
| 2010/0004002 A1 * | 1/2010 | Hahn | H04L 63/0414 455/458 |

(Continued)

OTHER PUBLICATIONS

International Search Report and Written Opinion of the International Searching Authority, PCT/EP2021/052795 mailed May 12, 2021, 9 pages.

(Continued)

*Primary Examiner* — Simon P Kanaan
(74) *Attorney, Agent, or Firm* — Sage Patent Group

(57) ABSTRACT

Security and privacy mechanisms are provided to protect the L2 identifiers used in groupcast communications over the sidelink (e.g., PC5 interface) without requiring a UE to periodically refresh the L2 identifiers, which may cause extra signaling overhead, increased latency and greater risk of synchronization issues. To prevent tracking of a UE, a group identifier (ID) is used as a source layer 2 (L2) ID in groupcast messages. Additionally, a message authentication code (MAC) is introduced into the group discovery procedure to authenticate the UE sending a group discovery request.

20 Claims, 11 Drawing Sheets

(56) References Cited

U.S. PATENT DOCUMENTS

2017/0054694 A1* 2/2017 Fujikami .............. H04L 9/0863

OTHER PUBLICATIONS

Huawei, et al., "Clarification on groupcast L2 IDs for privacy", S2-2000411, 3GPP Draft, Jan. 7, 2020, (XP051842482), 3 Pages.

"3rd Generation Partnership Project; Technical Specification Group Services and System Aspects; Study on Security Aspects pf 3GPP support for Advanced V2X Services (Release 16)", 3GPP TR 33.836 V16.1.0, 3GPP Standard, Jul. 9, 2019, (XP051754614), 51 Pages.

"3rd Generation Partnership Project; Technical Specification Group Services and System Aspects; Study on Security Aspects pf 3GPP support for Advanced V2X Services (Release 16)", 3GPP TR 33.836 V0.2.0, 3GPP Standard, Jun. 2019, (XP51754614A), 21 Pages.

"3rd Generation Partnership Project; Technical Specification Group Services and System Aspects; Architecture enhancements for 5G System (5GS) to support Vehicle-to-Everything (V2X) services (Release 17)", GPP TS 23.287 v17.2.0, 3GPP, Dec. 2021, (60 Pages).

"3rd Generation Partnership Project; Technical Specification Group Services and System Aspects; Proximity-based services (ProSe); Stage 2 (Release 17)", GPP TS 23.303 V17.0.0, Dec. 2021, 130 Pages.

* cited by examiner

PRIVACY PROTECTION FOR SIDELINK COMMUNICATIONS

CROSS REFERENCE TO RELATED APPLICATIONS

This application is a 35 U.S.C. § 371 national stage application of PCT International Application No. PCT/EP2021/052795 filed on Feb. 5, 2021, which claims priority to U.S. Provisional Application No. 62/979,563, filed on Feb. 21, 2020, the disclosures and contents of which are incorporated by reference herein in their entireties.

TECHNICAL FIELD

The present disclosure relates generally to device-to-device (D2D) communications and, more particularly to security and privacy measures for sidelink communications over the PC5 interface.

BACKGROUND

Sidelink is a feature in Long Term Evolution (LTE) systems that enables direct device-to-device (D2D) communications between user equipment (UE) without sending data to the network. Sidelink also enables a UE outside of cell coverage to reach the network via a relay UE. The remote UE communicates with the relay UE over the sidelink interface and the relay UE relays communications between the network and the remote UE.

Sidelink was first introduced in Release 12 (Rel-12) of the LTE standard and targeted public safety use cases. Sidelink has been extended in Releases 13 and 14 (Rel-13 and Rel-14) to enlarge the use cases that could benefit from the D2D technology. In LTE Rel-14 and Rel-15, sidelink is enhanced to support vehicle-to-everything (V2X) communications that enables any combination of direct communications between vehicles, pedestrians and the infrastructure.

Sidelink is also implemented in the New Radio (NR) standard, also known as Fifth Generation (5G). While LTE V2X mainly aims at traffic safety services, NR V2X has a much broader scope including not only basic safety services but also non-safety applications, such as sensor/data sharing between vehicles with the objective to strengthen the perception of the surrounding environment. Hence a new set of applications such as vehicle platooning, cooperative maneuvering between vehicles, and remote/autonomous driving may enjoy such enhanced sidelink framework.

Currently, there is an ongoing study in the 3GPP SA3 working group looking into the security issues and solutions for the support of V2X in NR/5G systems. The study is being documented in the third Generation Partnership Project (3GPP) TR (Technical Report) 33.836, v.0.5.0. Among the issues identified, a few are related to privacy for communication over the PC5 interface. One issue being discussed is the from the disclosure of the Layer 2 (L2) identifiers over the PC5 interface and the risk that an eavesdropper can track UEs based on the L2 identifiers.

SUMMARY

The present disclosure relates to security mechanisms to protect the L2 identifiers used in groupcast communications over the sidelink (e.g., PC5 interface) without requiring the UE to periodically refresh the L2 identifiers, which may cause extra signaling overhead, increased latency and greater risk of synchronization issues. To prevent tracking of a UE, a group identifier (ID) is used as a source layer 2 (L2) ID in groupcast messages. By using a group identifier as the source L2 ID in groupcast message, an attacker cannot link the source L2 ID with a particular endpoint and thus cannot use the source L2 ID in groupcast communications to track a UE. Additionally, a message authentication code (MAC) is introduced into the group discovery procedure to authenticate the UE sending a group discovery request. The receiving UEs can authenticate the requestor based on the MAC and respond if the identity of the requestor is verified. Otherwise the receiving UEs do not respond to prevent the attacker from discovering who is in the area. These new security features can be used together or separately.

According to a first aspect, there is provided a method of groupcasting implemented by a user equipment configured for device-to-device communication. The method comprises the UE sending a groupcast message to members of a device group including the UE, the groupcast message including a first group identifier for the device group as a destination layer 2, L2, identifier of the groupcast message and a second group identifier for the device group as the source L2 identifier for the groupcast message.

According to a second aspect, there is provided a method of groupcasting implemented by a UE configured for D2D communication. The method comprises the UE receiving a groupcast message from a members of a device group including the UE, the groupcast message including a first group identifier for the device group as a destination Layer 2, L2, identifier of the groupcast message and a second group identifier for the device group as the source L2 identifier for the groupcast message.

According to a third aspect, there is provided a UE configured for group communication over a side link, wherein the UE comprises communication circuitry configured for group communication over a side link, and processing circuitry configured to send a groupcast message to members of a device group including the UE. The groupcast message includes a first group identifier for the device group as a destination layer 2, L2, identifier of the groupcast message and a second group identifier for the device group as the source L2 identifier for the groupcast message.

According to a fourth aspect, there is provided a UE configured to send a groupcast message to members of a device group including the UE. The groupcast message includes a first group identifier for the device group as a destination layer 2, L2, identifier of the groupcast message and a second group identifier for the device group as the source L2 identifier for the groupcast message.

According to a fifth aspect, there is provided a UE configured for group communication over a side link. The UE comprises communication circuitry configured for group communication over a side link and processing circuitry configured to receive a groupcast message from a members of a device group including the UE. The groupcast message includes a first group identifier for the device group as a destination Layer 2, L2, identifier of the groupcast message and a second group identifier for the device group as the source L2 identifier for the groupcast message.

According to a sixth aspect, there is provided a UE configured to receive a groupcast message from a members of a device group including the UE. The groupcast message includes a first group identifier for the device group as a destination Layer 2, L2, identifier of the groupcast message and a second group identifier for the device group as the source L2 identifier for the groupcast message.

Advantages with the techniques for enhancing privacy of L2 identifiers as described herein are simple, can be easily implemented and have only limited impact on the current standards. Further, the techniques as herein described do not require the UEs to update the L2 ID periodically, which may cause extra signaling overhead, increased latency overhead and greater risk of synchronization problems.

DETAILED DESCRIPTION

Figure 1:
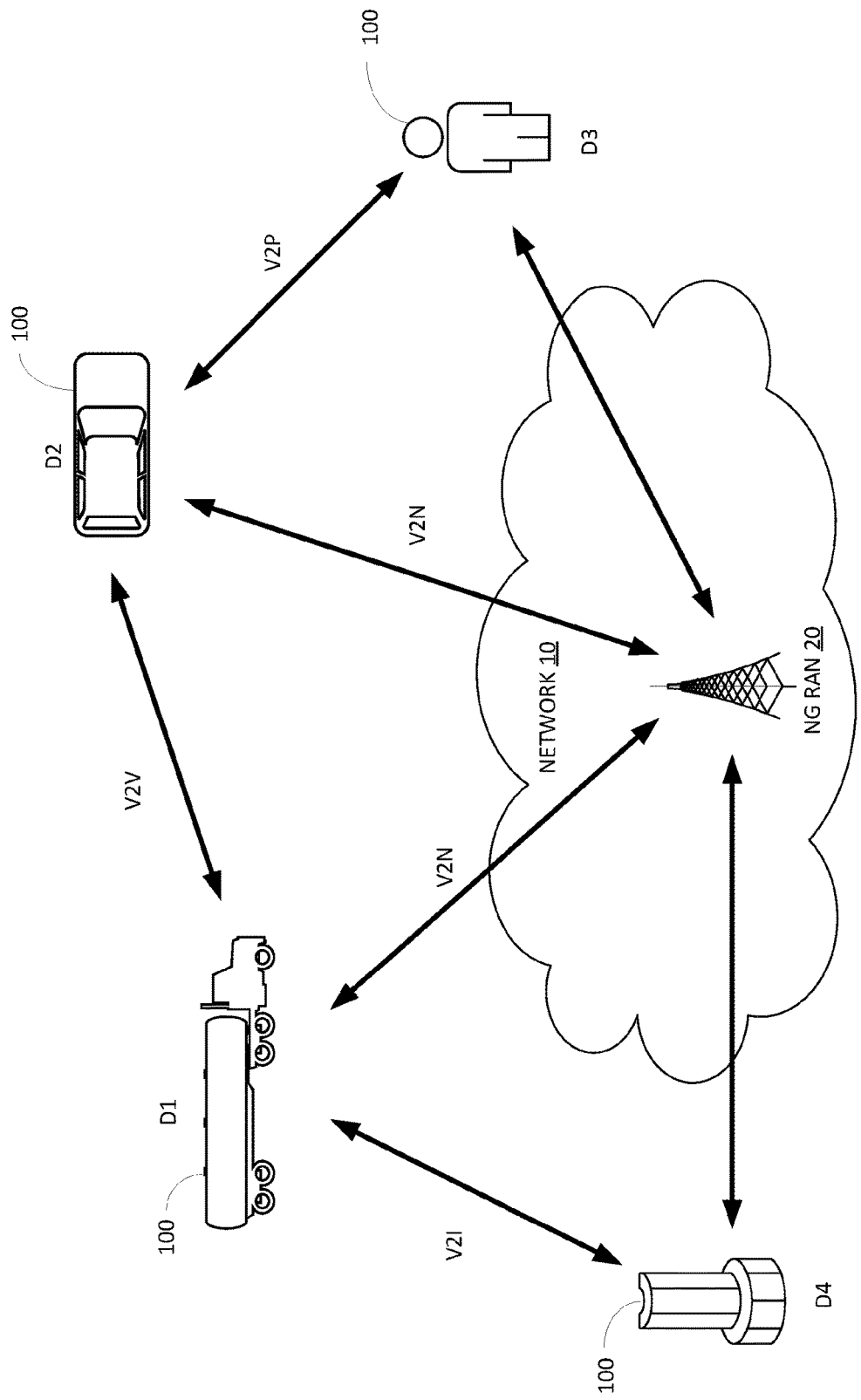
FIG. 1 illustrates an exemplary network supporting D2D communications.

Referring now to the drawings, an exemplary embodiment of the disclosure will be described in the context of a 5G or NR network. Those skilled in the art will appreciate that the methods and apparatus herein described are not limited to use in 5G or NR networks, but may also be used in other wireless communication networks 10 supporting V2X communications.

FIG. 1 illustrates a wireless communication network 10 according to the NR standard supporting V2X communications. The wireless communication network 10 comprises a Next Generation Radio Access Network (NG RAN) 20 including one or more base stations 25 providing service to user equipment (UEs) 100 in respective cells of the wireless communication network 10. The base stations 25 are also referred to as Evolved NodesBs (eNBs) in LTE and as 5G NodeBs (gNBs) in NR. A base station 25 connected to a 5G Core (5GC) 30 and implementing LTE over the air interface is referred to as a next generation eNB (ng-eNB). Although only one cell and one base station 25 are shown in FIG. 1, those skilled in the art will appreciate that a typical wireless communication network 10 comprises many cells served by many base stations 25.

The UEs 100 may comprise any type of equipment capable of communicating with the base station 25 over a wireless communication channel. For example, the UEs 100 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

FIG. 1 illustrates four UEs 100 denoted D1-D4 respectively. The UEs 100 are configured for D2D communication (e.g., V2X communication) over a sidelink (e.g. PC5 interface) and are also referred to herein as D2D devices or V2X devices. The UEs 100 may also be configured to communicate over the Uu interface. Devices D1 and D2 are carried onboard vehicles. Device D3 is mounted to some infrastructure (e.g., roadside sign). Device D4 comprises a cell phone or smart phone capable of D2D communication. In the example illustrated in FIG. 1, Device D1 is engaged in vehicle-to-vehicle (V2V) communication with Device D2 and vehicle-to-infrastructure (V2I) communication with Device D4. Device D2 is engaged in vehicle-to-vehicle (V2V) communication with Device D3 and vehicle-to-person (V2P) communication with Device D3. All four devices are capable of communication with the network 10 via base station 25.

Figure 2:
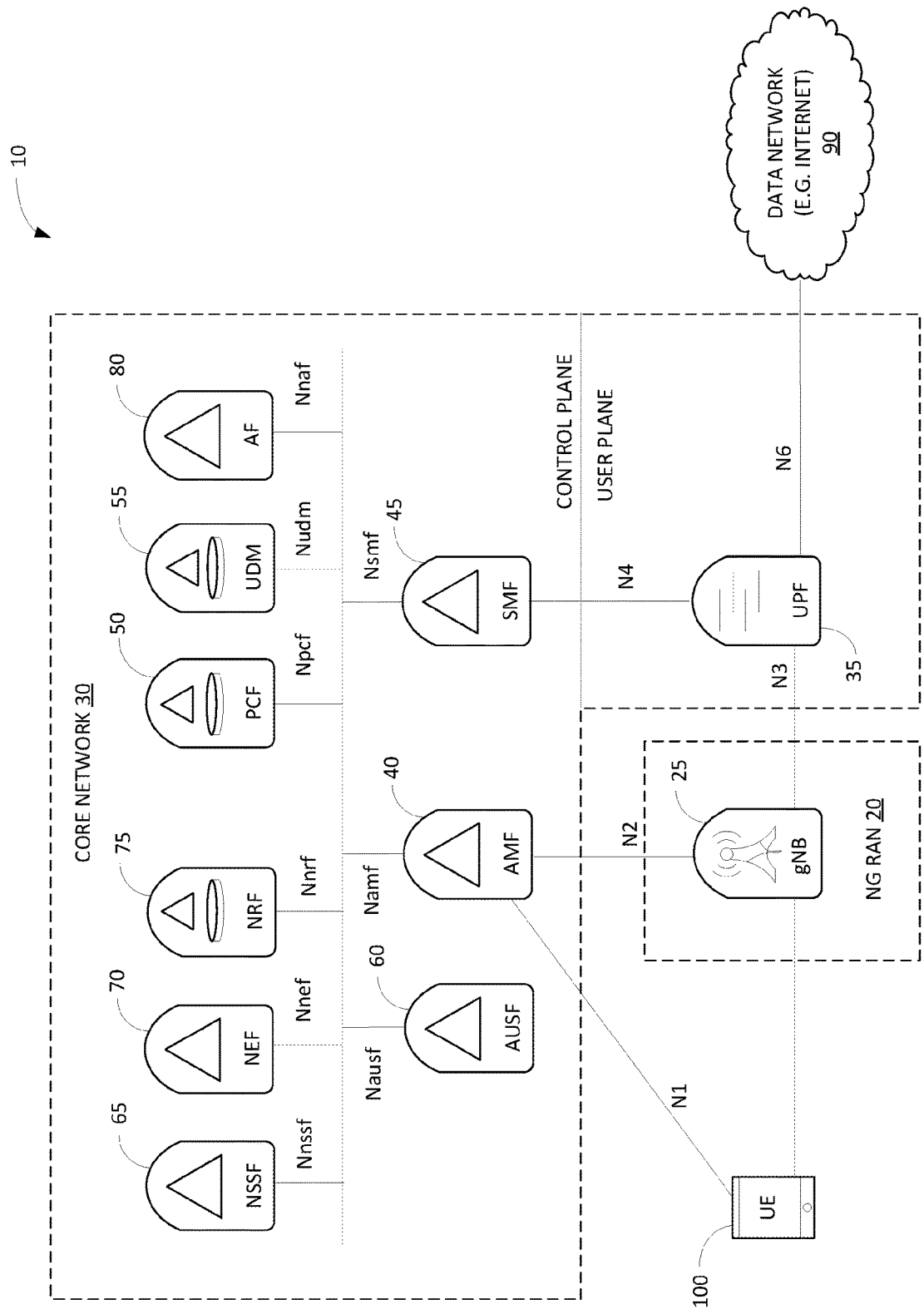
FIG. 2 illustrates a system architecture of a 5G network.

FIG. 2 illustrates the system architecture for a 5G network in more detail. The base stations 25 in the NG RAN 20 allow the UEs 100 to gain connectivity to the 5GC 30. The base stations 25 could be gNBs or ng-eNBs in 5G. The 5GC 30 contains Network Functions (NFs) providing a wide range of different functionalities such as session management, connection management, charging, authentication, etc. The % GC 30 includes a user plane and a control plane. A User Plane Function (UPF) 35 in the user plane provides connection to an external data network 90. In one exemplary embodiment, the NFs in the control plane include a an Access And Mobility Management Function (AMF) 40, a Session Management Function (SMF) 45, a Policy Control Function (PCF) 50, a Unified Data Management (UDM) function 55, a Authentication Server Function (AUSF) 60, a Network Slice Selection Function (NSSF) 65, a Network Exposure Function (NEF) 70, a Network Repository Function (NRF) 75 and one or more Application Functions (AFs) 80. These NFs comprise logical entities that reside in one or more core network nodes, which may be implemented by one or more processors, hardware, firmware, or a combination thereof. The various network functions may reside in a single core network node or may be distributed among two or more core network nodes. In exemplary embodiments herein described, an AF 80 is configured as a V2X server to provide support for V2X services.

In conventional wireless communication network, the various NFs (e.g., SMF 45, AMF 40, etc.) in the 5GC 30 communicate with one another over predefined interfaces. In the service-based architecture shown in FIG. 1, instead of predefined interfaces between the control plane functions, the wireless communication network 10 uses a services model in which the NFs query the NRF 75 or other NF discovery node to discover and communicate with each other.

Figure 3:
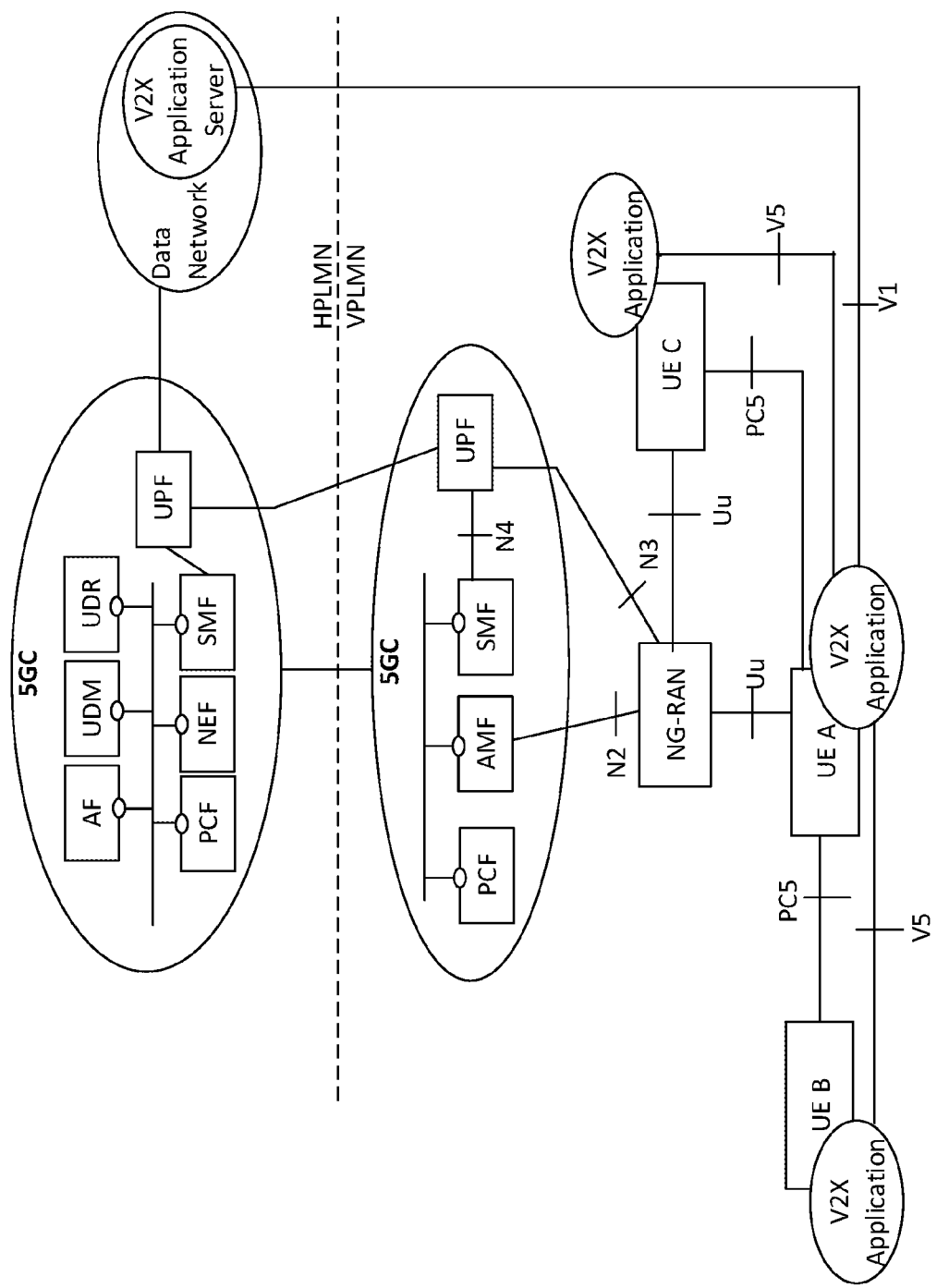
FIG. 3 illustrates system architecture for V2X communications.

FIG. 3 illustrates the roaming architecture for V2X-capable UEs 100 in NR/5G networks. V2X applications hosted on or associated with the UEs 100 roaming in a visited Public Land Mobile Network (PLMN), denoted UE A-C in FIG. 3, communicate with other V2X applications over the V5 interface, and with a V2X server in the home in the home PLMN over the V1 interface.

For V2X communication, two interfaces could be used. The UE 100 can use the usual Uu interface, i.e., air interface, between the UE 100 and the base station 25. The UE 100 can also use the PC5 interface, a.k.a. the sidelink, introduced during the development of the proximity service features for LTE in Release 14. Depending on the radio access technology (RAT) used, the sidelink can be LTE or NR-based. In contrast to the LTE-based PC5, the NR-based PC5 interface is extended to support not only broadcast communication, but also groupcast and unicast communication. In addition, for unicast communication, the NR-based PC5 interface will have separate control and user planes.

Figure 4:
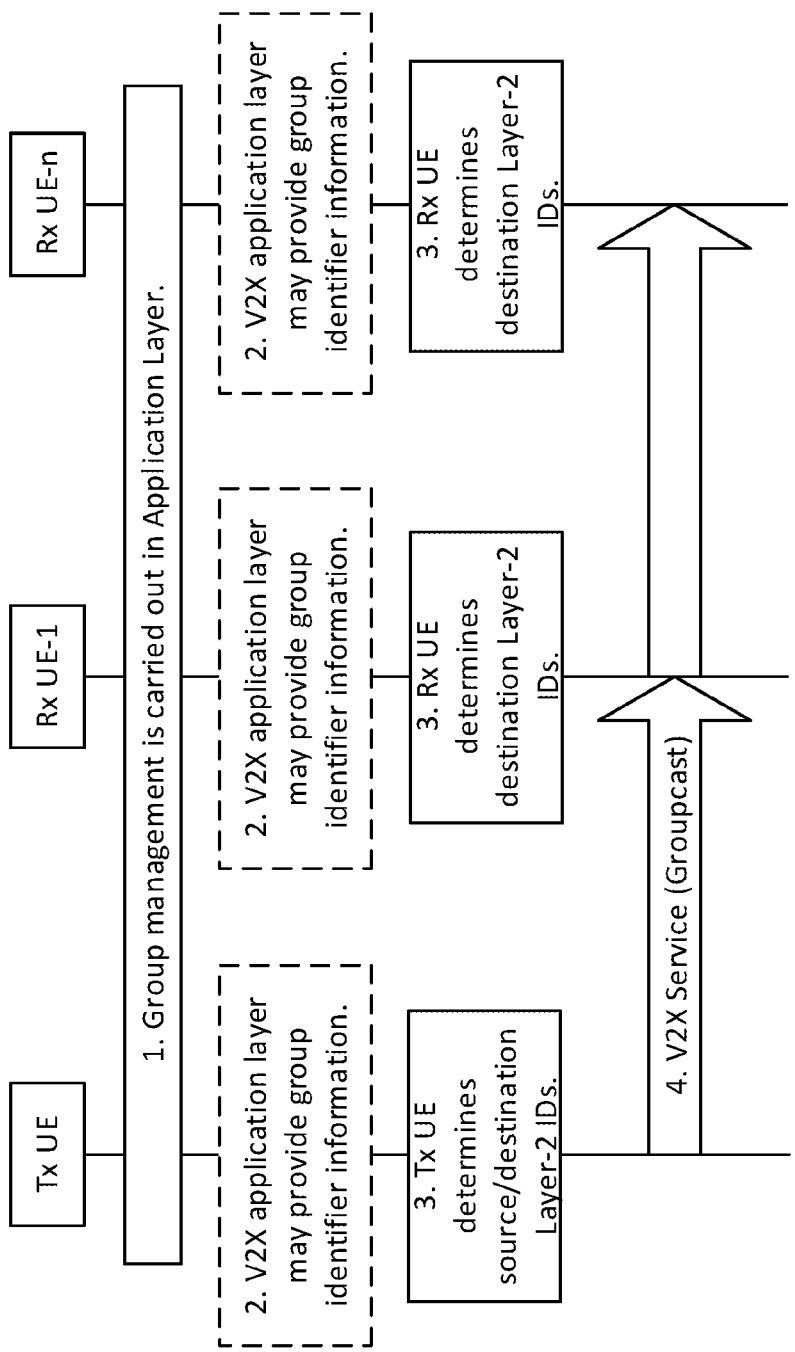
FIG. 4 illustrates a procedure for groupcast mode of V2X communication over the PC5 interface.

FIG. 4 illustrates a procedure for groupcast mode of V2X communication over the PC5 interface. To perform groupcast mode of V2X communication over the PC5 interface, the UE 100 is configured with the related information as described in 3GPP TS 23.287, v.16.1.0, clause 5.1.2.1. V2X group management is carried out by the V2X application layer (S1). The V2X application layer may provide group identifier information (i.e., an application-layer V2X group identifier) as specified in 3GPP TS 23.287, v.16.1.0, clause 5.6.1.3 (S2). The V2X application layer may additionally provide V2X application requirements for this communication. The transmitting UE 100 determines a source Layer-2 ID and a destination Layer-2 ID and the receiving UE 100(s) determine destination Layer-2 ID, as specified in 3GPP TS 23.287, v.16.1.0, clause 5.6.1.1 and clause 5.6.1.3. (S3) The destination Layer-2 ID is passed down to the access stratum (AS) layer of the receiving UE 100(s) for the group communication reception. The transmitting UE 100 also determines the PC5 QoS parameters for this groupcast as specified in 3GPP TS 23.287, v.16.1.0, clause 5.4.1.1 and clause 5.4.1.3. The transmitting UE 100 sends the V2X service data using the source Layer-2 ID and the destination Layer-2 ID (S4). The transmitting UE 100 has a V2X service associated with this group communication.

There are some concerns about the privacy of the groupcast communication as described in the current standard. One concern is not an eavesdropper or attacker capable of connecting and linking L2 identities to a real or a long-term eV2X endpoint identity will be able to track and trace the endpoint in space and time. Such trackability and linkability will be an attack on eV2X endpoint privacy. Also, if the attacker knows which L2 ID is used for the group communication, the attacker might be able to make an inquiry whether any member of certain group are exists in some location by broadcasting a group discovery request and waiting for a response from other group members in the area.

A mitigation strategy against exposure of the L2 identifiers is described in TS 3GPP TS 33.185, v.15.0.0. This mitigation strategy is used in the Evolved Packet System (EPS) implementation of V2X. The standard requires the UE 100 to regularly refresh the L2 identifiers and assign their values randomly. It is also specified that identifiers in the application layer and the lower layers (e.g., L2) be changed simultaneously. Thus, the application layer must indicate to the lower layers when such identifiers change. It should be noted that the implementation of V2X in EPS includes only broadcast type communication over PC5. The destination L2 identifiers in broadcast communication are fixed depending on the type of application and are not UE-specific. For this reason, it was deemed that the privacy mechanism described above is only needed for the source L2 identifiers on the sender side.

One aspect of the disclosure is to provide security mechanisms to protect the L2 identifiers used in groupcast communications over the sidelink (e.g., PC5 interface) without requiring the UE 100 to periodically refresh the L2 identifiers, which may cause extra signaling overhead, increased latency and greater risk of synchronization issues. To prevent tracking of a UE 100, a group identifier (ID) is used as a source layer 2 (L2) ID. By using a group identifier as the source L2 ID, an attacker cannot link the source L2 ID with a particular endpoint and thus cannot use the source L2 ID in groupcast communications to track a UE 100. Additionally, a message authentication code (MAC) is introduced into the group discovery procedure to authenticate the UE 100 sending a group discovery request. The receiving UEs can authenticate the requestor based on the MAC and respond if the identity of the requestor is verified. Otherwise the receiving UEs do not respond to prevent the attacker from discovering who is in the area. These new security features can be used together or separately.

Figure 5:
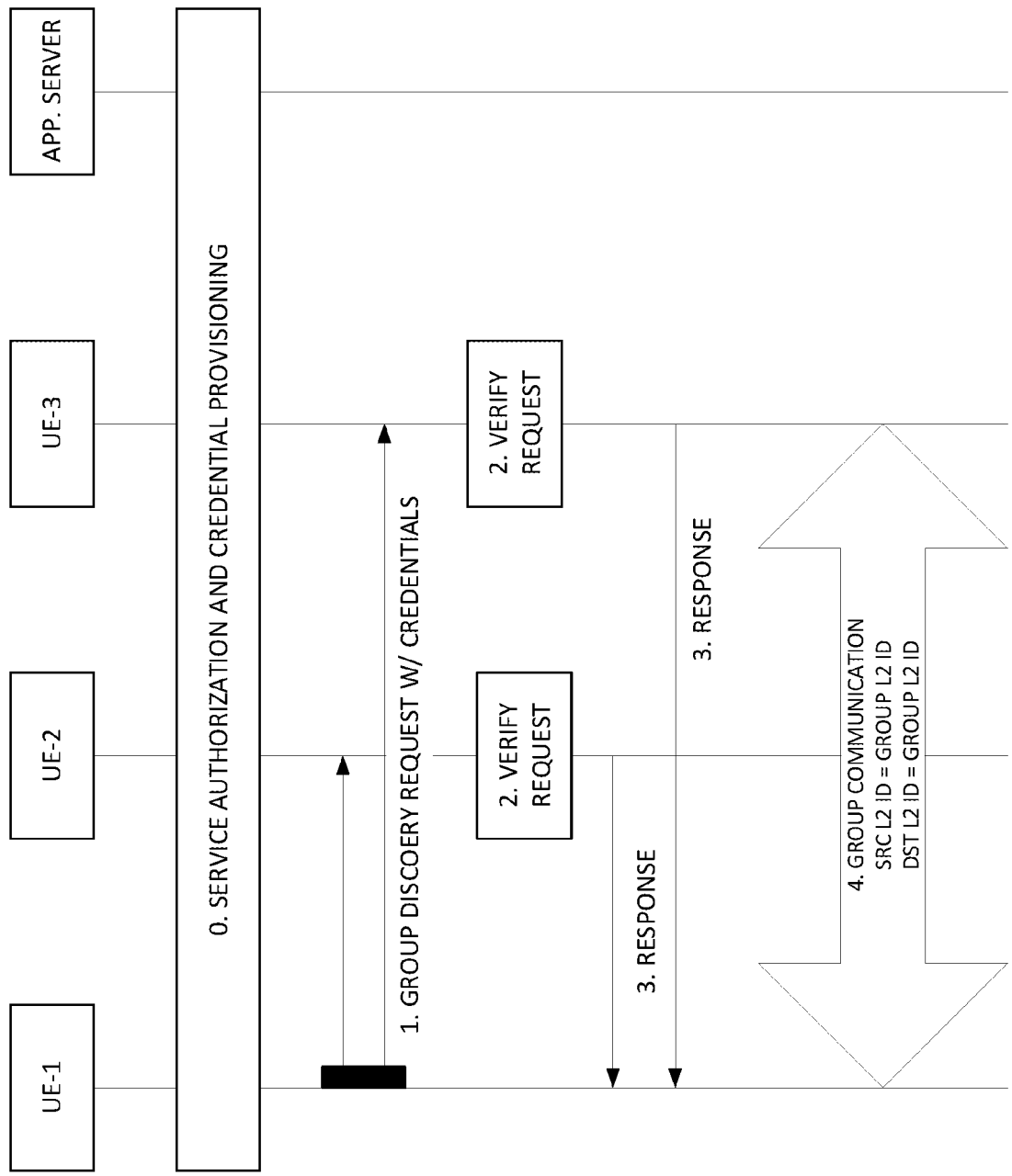
FIG. 5 illustrates an exemplary groupcast communication implementing the new security features.

FIG. 5 illustrates an exemplary groupcast communication implementing the new security features. In this example, there are three UEs (denoted UE1, UE-2 and UE-3) and an application server (AS), e.g., for some V2X service application. UE-1 tries to discover the group members in its proximity. At S0, all the UEs perform an authentication procedure with the application server so that they are authorized to use the corresponding service, including group discovery. If the UEs are successfully authorized, the application server provides a credential to the UEs. The credential could be a Key, K, which is used for generating a MAC for the group discovery message and/or for encrypting groupcast communications.

The key K could be per application, i.e., for each type of application the server creates a key. The key K could be also per group. For example, if some applications have a predefined group, then for each group, the server generates a key K and gives it to the corresponding group members. If a UE 100 belong to multiple groups, the UE 100 may have different keys for different group. In our example shown in FIG. 1, we assume the key is for the application.

In some embodiments, the key K may not be provisioned during the authentication procedure. In this case, the UE 100 can send a request message to the application server to request a key. In response to the request from the UE 100, the application server can generate a key dynamically and provide the key to the UE 100. The application server will not grant a key to a non-authorized UE 100.

At S1, UE-1 broadcasts a group discovery request message with the group ID and destination L2 ID for the group. In our example, X denotes the L2 ID for the group. In the group discovery message, UE-1 includes a MAC, UE application ID, and an optional replay protection parameter. The MAC can be generated according to:

MAC=HASH$_K$ (UE-1 ID||replay protection parameter (RPP)||message payload).

The replay protection parameter can be a timestamp, sequence number or even location information (e.g., Global Positioning System (GPS) coordinates). The HASH$_K$ function could be any one-way keyed function such as the Key Derivation Function (KDF) described in TS 33.220, v.16.0.0, (Annex B.2.0). An exemplary format of the group discovery message is as follows:

<src L2 ID, dst L2 ID, MAC, EN$_K$(UE application ID, RPP, message payload)>

At S2, the receiving UEs, i.e., UE-2 and UE-3, decrypt the group discovery message and verify the MAC received in the group discovery request. The Mac is verified by regenerating the MAC using the UE application ID and replay protection parameter in the group discovery request message and comparing the regenerated MAC with the received MAC. The receiving UE 100 generates the MAC using the same method as the transmitting UE 100. If the MAC is valid, and if the corresponding UE 100 belongs to the group, it sends a discovery response to UE-1 at S3; otherwise it does nothing.

In some embodiments, the receiving UEs are not provisioned with the key K. In this case, UE-2 and UE-3 can forward the group discovery request message to the application server for verification.

At S4, the UEs engage groupcast communication. In order to prevent an attacker from linking the source L2 ID with the group L2 ID. The group members use the group L2 ID in both the source L2 ID and the destination L2 ID. An exemplary message format for groupcast messages is as follows:

<src L2 ID=X, dst L2 ID=X, $EN_K$(UE application ID, message payload)>

Note that the UE application ID can be used to indicate the origin of the message and is therefore encrypted so that the attacker cannot determine the source of the message. In fact, any ID at other than L2 layer that is not protected can be used to track the source UE 100 and hence defeats the purpose of the privacy protection as herein described. Therefore, the source ID at any layer is either encrypted as in the example above or equated with the corresponding destination ID.

In the example, the same key is used to generate the MAC and for message encryption. In some embodiments, the group members may establish a different key for message encryption. For example, the group members may establish a symmetric key for the group communication during the group management phase or the encryption key can be provisioned by the application server. Any standard method can be used to establish the encryption key for groupcast communication.

In case of IP-based communications, the substitution of a group ID for the source ID can be applied to the source and destination IP addresses contained in a groupcast message.

The technique of substituting a group identifier for the source L2 ID can also be applied to the group discovery message.

Figure 6:
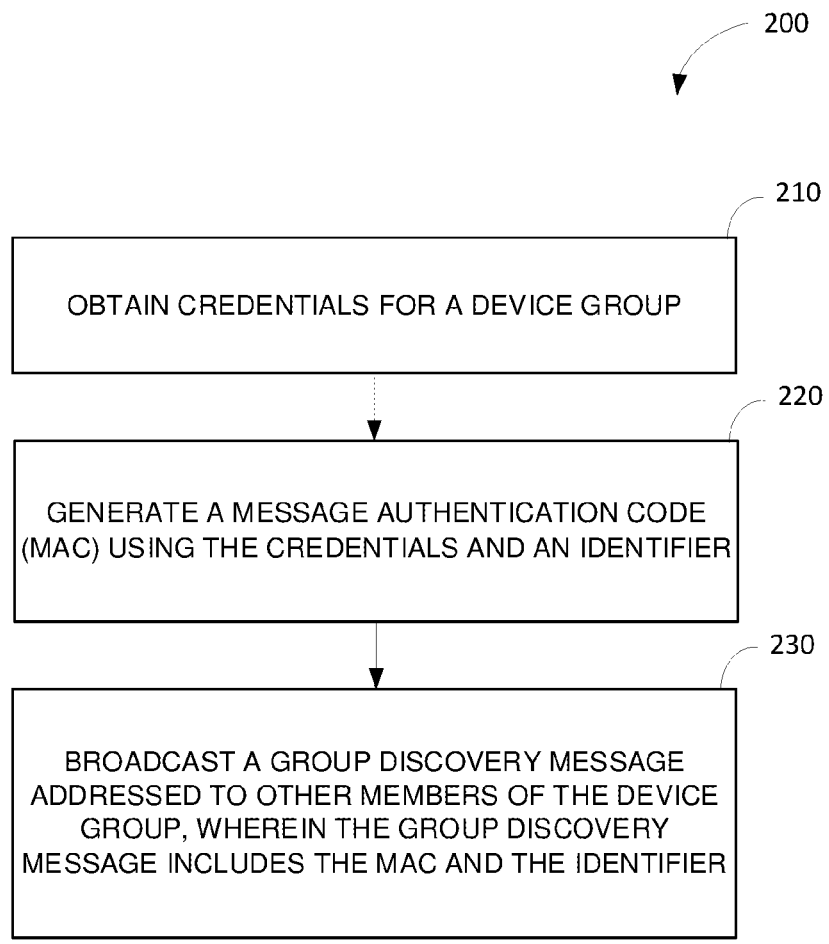
FIG. 6 illustrates an exemplary discovery method implemented by a transmitting UE in a device group of discovering other members of the device group.

FIG. 6 illustrates an exemplary discovery method 200 implemented by a transmitting UE 100 in a device group of discovering other members of the device group. The UE 100 obtains credentials for the device group (block 210). The UE 100 further generates a MAC using the credentials and an identifier (block 220) and broadcasts a group discovery message addressed to other members of the device group, wherein the group discovery message includes the MAC and the identifier (block 230).

In some embodiments of the method 200, the identifer comprises an application identifier. In other embodiments of the method 200, the identifer comprises a source Layer 2 (L2) identifier. In still other embodiments of the method 200, the identifier comprises a group identifer for the device group.

In some embodiments of the method 200, the group discovery message further comprises a replay protection parameter. The replay protection parameter may comprise at least one of a timestamp, sequence number, or location information.

Some embodiments of the method 200 further comprise receiving a group discovery response message from one or more other members of the device group, and engaging in groupcast communication with the one or more other members of the device group.

In some embodiments of the method 200, engaging in groupcast communication with the one or more other members of the device group comprises sending a groupcast message to or receiving a groupcast message from one or more other members of the device group. The groupcast message sent or received by the UE 100 includes a first group identifier for the device group as a destination Layer 2 (L2) identifier of the groupcast message and a second group identifier for the device group as the source L2 identifier for the groupcast message. In some embodiments, the first and second group identifiers for the device group are the same.

Figure 7:
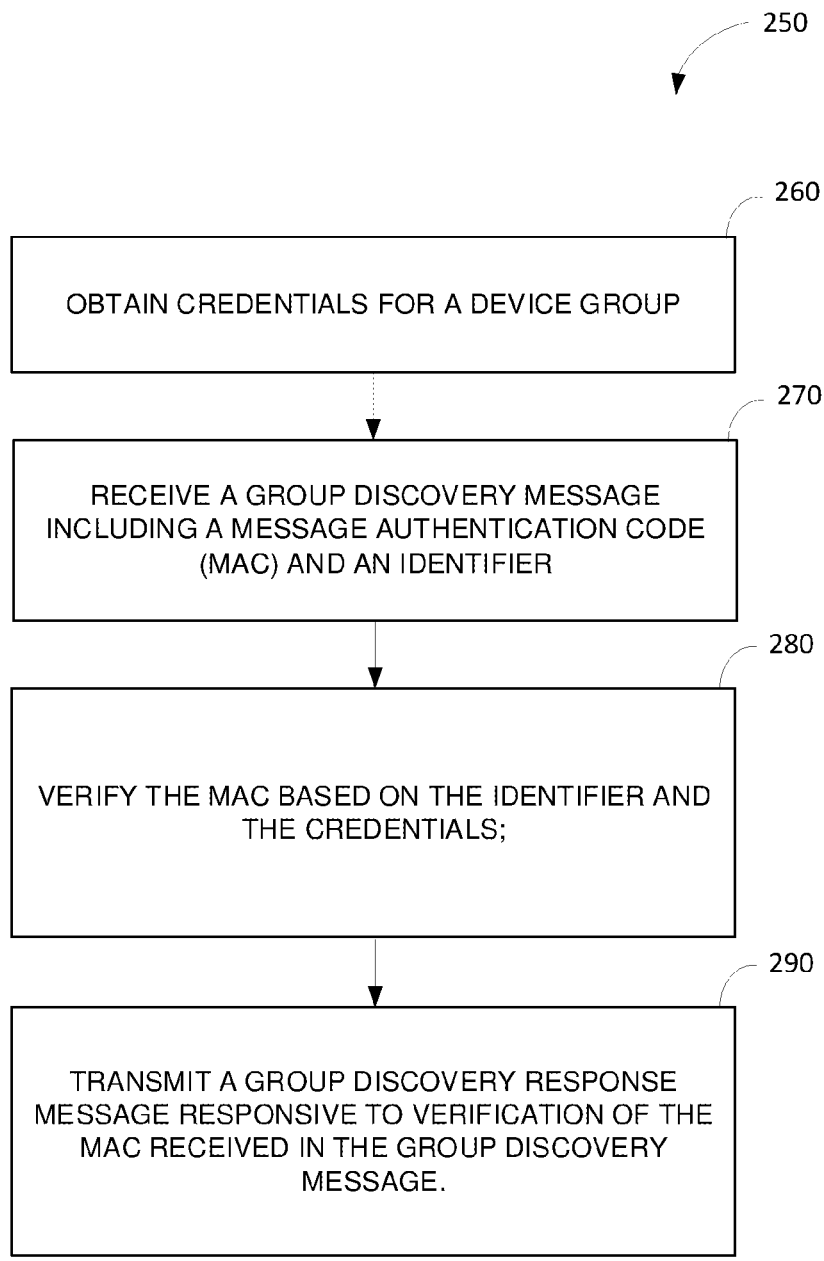
FIG. 7 illustrates an exemplary discovery method implemented by a receiving UE in a device group.

FIG. 7 illustrates an exemplary discovery method 250 implemented by a receiving UE 100 in a device group. The UE 100 obtains credentials for the device group (block 260). The receiving UE 100 further receives a group discovery message including a MAC and an identifier (block 270). The receiving UE 100 verifies the MAC based on the identifier and the credentials; (block 280). Responsive to verification of the MAC received in the group discovery request message, the UE 100 transmits a group discovery response message to the transmitting UE 100 (block 290).

In some embodiments of the method 250, the identifer comprises an application identifier. In other embodiments of the method 250, the identifer comprises a source Layer 2 (L2) identifier. In still other embodiments of the method 250, the identifier comprises a group identifer for the device group.

In some embodiments of the method 250, the group discovery message further comprises a replay protection parameter. The replay protection parameter may comprise at least one of a timestamp, sequence number, or location information.

In some embodiments of the method 250, the method further comprises engaging in groupcast communication with the one or more other members of the device group. The UE 100 may, for example, send a groupcast message to or receive a groupcast message from one or more other members of the device group. The groupcast message sent or received by the UE 100 includes a first group identifier for the device group as a destination Layer 2 (L2) identifier of the groupcast message and a second group identifier for the device group as the source L2 identifier for the groupcast message. In some embodiments, the first and second group identifiers for the device group are the same.

Figure 8:
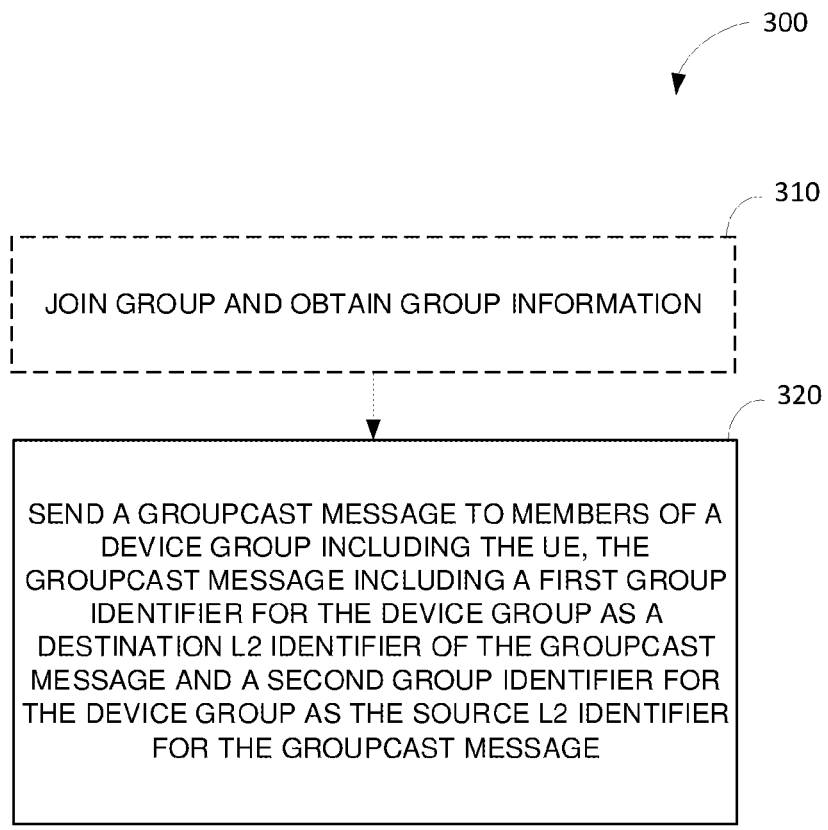
FIG. 8 illustrates an exemplary method of groupcast communication implemented by a transmitting UE in a device group.

FIG. 8 illustrates an exemplary method 300 of groupcast communication implemented by a transmitting UE 100 in a device group. The UE 100 optionally joins a device group and obtains group information such as group credentials (e.g., key) and one or more group IDs (block 310). When originating a groupcast communication, the UE 100 sends a groupcast message to other members of the device group (block 320). The groupcast message includes a first group ID for the device group as a destination Layer 2 (L2) identifier of the groupcast message and a second group ID for the device group as the source L2 identifier for the groupcast message.

In some embodiments of the method 300, the first and second group identifiers for the device group are the same.

In some embodiments of the method 300, the groupcast message further comprises an application identifier that identifies a source of the groupcast message.

Some embodiments of the method 300 further comprises encrypting the application identifier prior to sending the groupcast message.

In some embodiments of the method 300, the groupcast message further comprises a source Internet protocol (IP) address and a destination IP address.

In some embodiments of the method 300, the source IP address and destination IP address comprise group IP addresses.

In some embodiments of the method 300, the group IP addresses corresponding respectively to the source IP address and destination IP address are the same.

Figure 9:
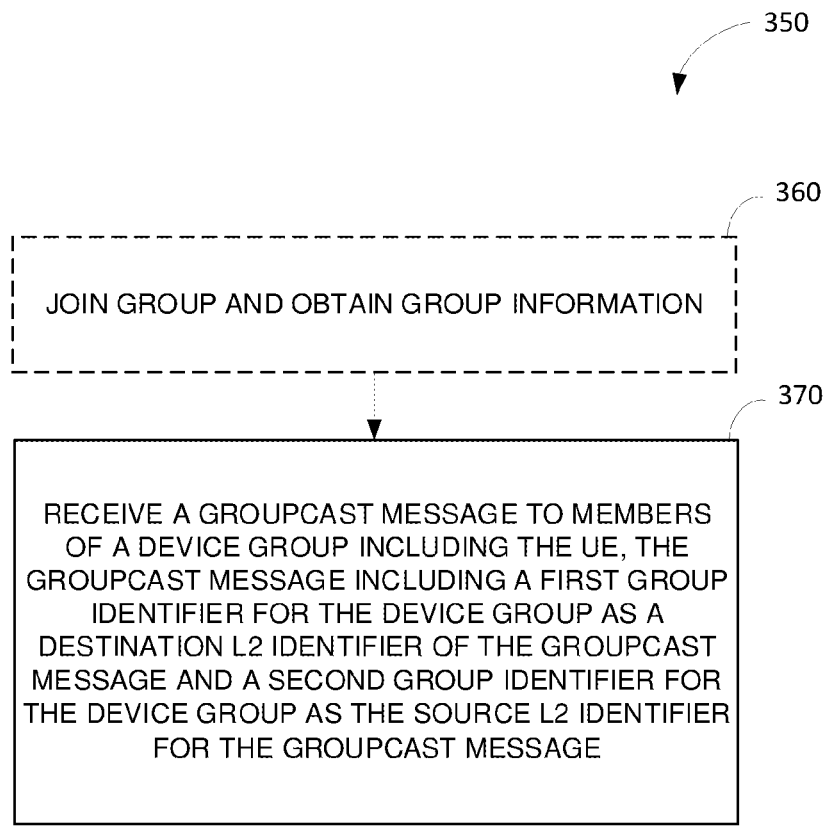
FIG. 9 illustrates an exemplary method of groupcast communication implemented by a transmitting UE in a device group.

FIG. 9 illustrates an exemplary method 350 of groupcast communication implemented by a transmitting UE 100 in a device group. The UE 100 optionally joins a device group and obtains group information such as group credentials (e.g., key) and one or more group IDs (block 360). The UE 100 receives a groupcast message from another member of the device group (block 370). The groupcast message includes a first group ID for the device group as a destination Layer 2 (L2) identifier of the groupcast message and a second group ID for the device group as the source L2 identifier for the groupcast message.

In some embodiments of the method 350, first and second group identifiers for the device group are the same.

In some embodiments of the method 350, the groupcast message further comprises an application identifier that identifies a source of the groupcast message.

In some embodiments of the method 350, the application identifier is encrypted and further comprising decrypting the application identifier prior to sending the groupcast message.

In some embodiments of the method 350, the groupcast message further comprises a source Internet protocol (IP) address and a destination IP address.

In some embodiments of the method 350, the source IP address and destination IP address comprise group IP addresses.

In some embodiments of the method 350, the group IP addresses corresponding respectively to the source IP address and destination IP address are the same.

Figure 10B:
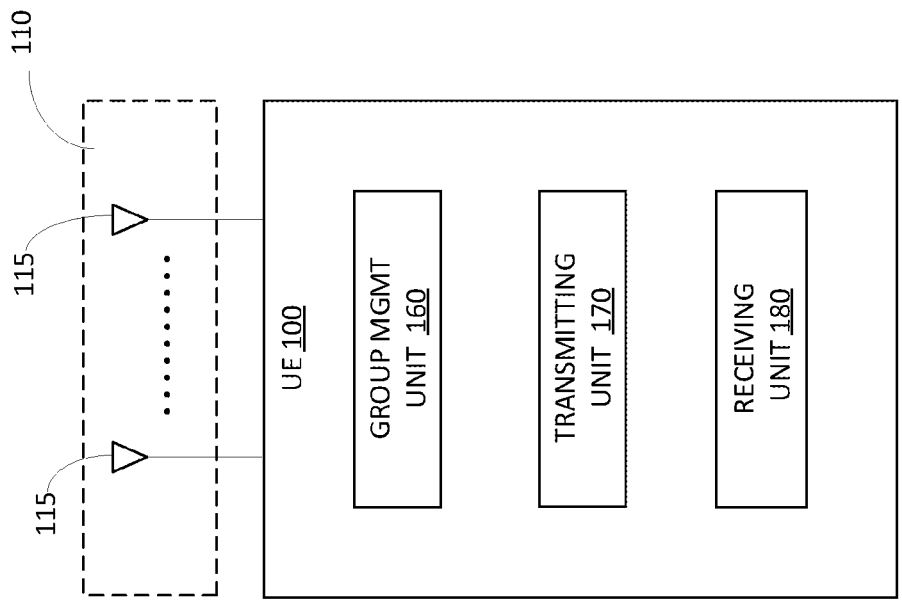
FIG. 10B illustrates an exemplary UE configured to engage in groupcast communications as herein described.
Figure 10A:
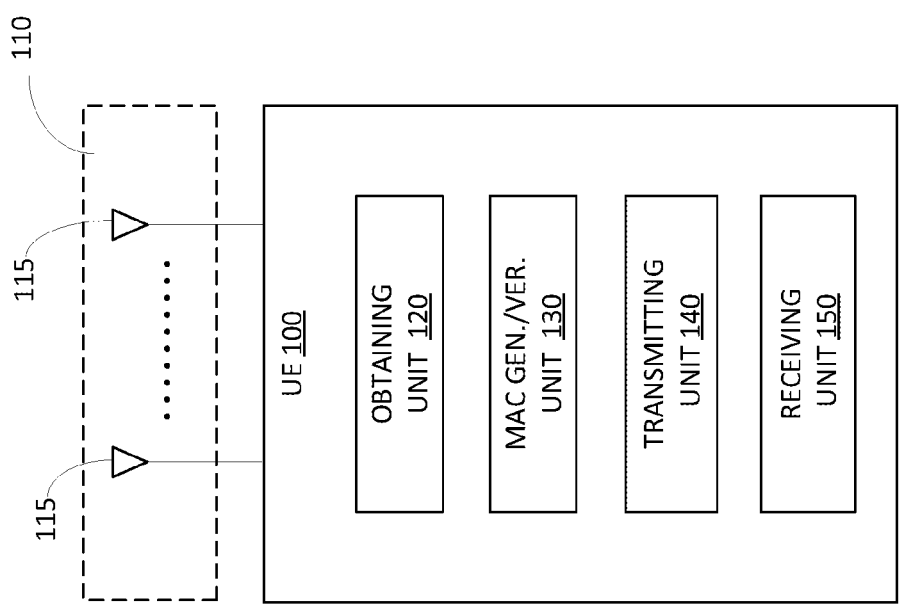
FIG. 10A illustrates an exemplary UE configured for group discovery as herein described.

FIG. 10A illustrates an exemplary UE 100 configured for group discovery as herein described. The UE 100 comprises an antenna array 110 with one or more antennas 115, an obtaining unit 120, a MAC generation/verification unit 130, a transmitting unit 140 and a receiving unit 150, The various units 120-150 can be implemented by hardware and/or by software code that is executed by one or more processors or processing circuits. The obtaining unit 120 is configured to obtain credentials for a device group, e.g., from an application server. The MAC generation/verification unit 130 is configured to generate and/or verify a MAC based on the credentials and an identifier, e.g., UE application ID. The transmitting unit 140 is configured to broadcast a group discovery message addressed to other members of the device group of a or response to a group discovery message, where the group discovery message includes the MAC and the identifier. The receiving unit 150 is configured to receive a group discovery message broadcast by another member of the device group, where the group discovery message includes the MAC and the identifier FIG. 10B illustrates an exemplary UE 100 configured to engage in groupcast communications as herein described. The UE 100 comprises an antenna array 110 with one or more antennas 115, a group management unit 160, a transmitting unit 170 and a receiving unit 180. The various units 160-180 can be implemented by hardware and/or by software code that is executed by one or more processors or processing circuits. The group management unit 160 is configured to join a device group and obtains group information such as group credentials (e.g., key) and one or more group IDs. The transmitting unit 170 is configured to send a groupcast message to other members of the device group.

The groupcast message includes a first group ID for the device group as a destination Layer 2 (L2) identifier of the groupcast message and a second group ID for the device group as the source L2 identifier for the groupcast message. The receiving unit 180 is configured to receive a groupcast message to other members of the device group. The groupcast message includes a first group ID for the device group as a destination Layer 2 (L2) identifier of the groupcast message and a second group ID for the device group as the source L2 identifier for the groupcast message.

Figure 11:
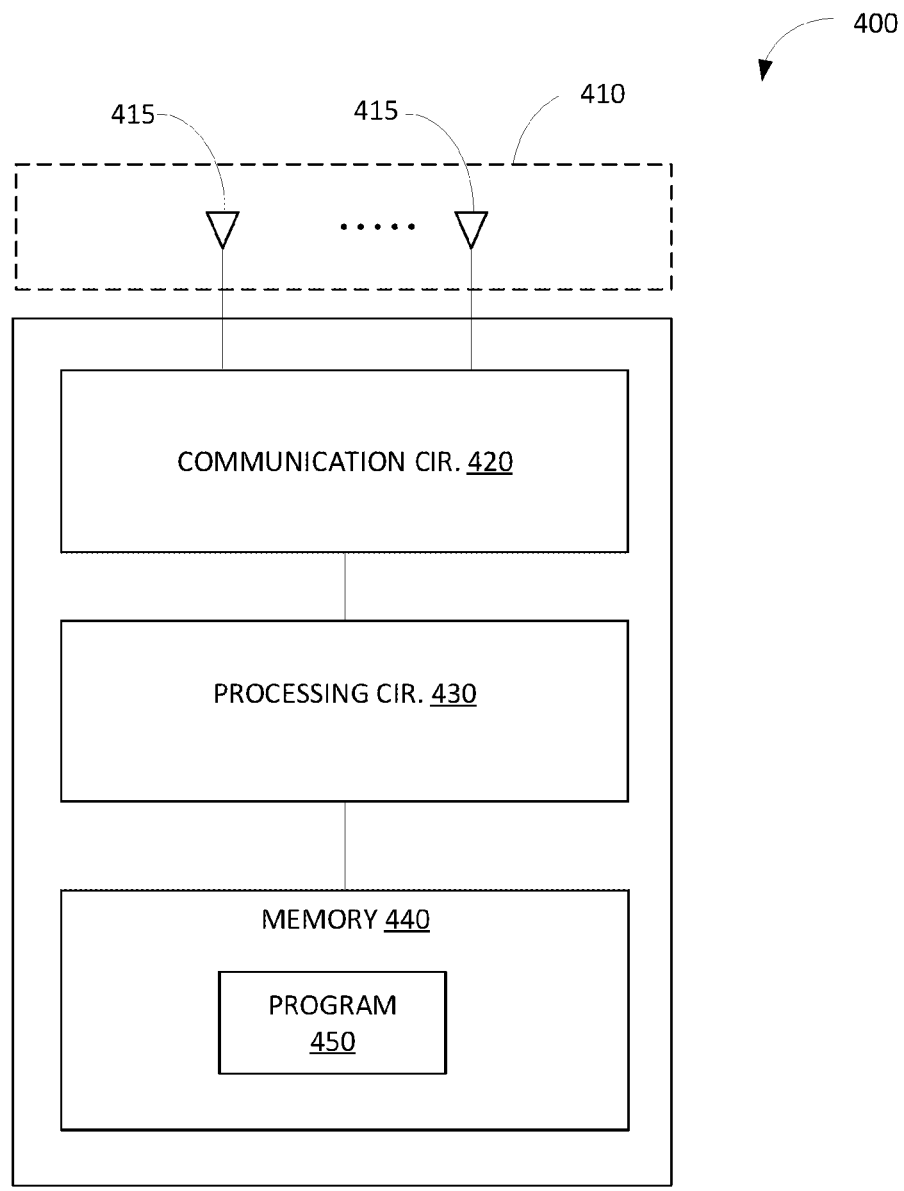
FIG. 11 illustrates an exemplary UE configured to send and/or receive D2D groupcast messages as herein described.

FIG. 11 illustrates an exemplary UE 400 configured to send and/or receive D2D groupcast messages as herein described. The UE device 400 comprises an antenna array 410 with multiple antenna elements 414, communication circuitry 420, a processing circuitry 430, and memory 440.

The communication circuitry 420 is coupled to the antennas 414 and comprises the radio frequency (RF) circuitry needed for transmitting and receiving signals over a wireless communication channel. The communication circuitry 420 is configured to operate according to the NR standard and is capable of D2D communication (e.g., V2X) over the sidelink (e.g., PC5 interface).

The processing circuitry 430 controls the overall operation of the UE 400 and processes the signals transmitted to or received by the UE 400. Such processing includes coding and modulation of transmitted data signals, and the demodulation and decoding of received data signals. The processing circuitry 430 may comprise one or more microprocessors, hardware, firmware, or a combination thereof. The processing circuitry 430 is configured to perform the methods as herein described, including one or more of the methods shown in FIGS. 6-9.

Memory 440 comprises both volatile and non-volatile memory for storing computer program code and data needed by the processing circuit 440 for operation. Memory 440 may comprise any tangible, non-transitory computer-readable storage medium for storing data including electronic, magnetic, optical, electromagnetic, or semiconductor data storage. Memory 440 stores a computer program 450 comprising executable instructions that configure the processing circuitry 430 to implement the methods 200 and/or 300 as described herein. A computer program 450 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, the computer program 450 for configuring the processing circuitry 430 as herein described may be stored in a removable memory, such as a portable compact disc, portable digital video disc, or other removable media. The computer program 450 may also be embodied in a carrier such as an electronic signal, optical signal, radio signal, or computer readable storage medium.

Those skilled in the art will also appreciate that embodiments herein further include corresponding computer programs 650. A computer program 650 comprises instructions which, when executed on at least one processor of an apparatus, cause the apparatus to carry out any of the respective processing described above. A computer program 650 in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The security protocol for concealing group identifier as herein described does not require additional signaling other than the inclusion of additional parameters in existing signaling messages. The security protocol mitigates against the UE tracking threat while engaging in groupcast communication. The security protocol reuses the legacy mechanism for source L2 Identifier privacy protection.

The techniques for enhancing privacy of L2 identifiers as described herein are simple, can be easily implemented and have only limited impact on the current standards. Further, the techniques as herein described do not require the UEs to update the L2 ID periodically, which may cause extra signaling overhead, increased latency overhead and greater risk of synchronization problems.

The invention claimed is:

1. A method of groupcasting implemented by a user equipment, UE, configured for device-to-device, D2D, communication, comprising:
    obtaining group information of a device group, the group information including a first group identifier for the device group as a destination layer 2, L2, identifier and a second group identifier for the device group as the source L2 identifier for the groupcast message; and
    sending a groupcast message to members of a device group including the UE, the groupcast message including the first group identifier for the device group as the destination L2 identifier of the groupcast message and the second group identifier for the device group as the source L2 identifier for the groupcast message.

2. The method of claim 1 wherein the first group identifier and the second group identifier for the device group are the same.

3. The method of claim 1 wherein the groupcast message further comprises an application identifier that identifies a source of the groupcast message.

4. The method of claim 3 further comprising encrypting the application identifier prior to sending the groupcast message.

5. The method of claim 1 wherein the groupcast message further comprises a source Internet protocol, IP, address and a destination IP address.

6. The method of claim 4 wherein the source IP address and destination IP address comprise group IP addresses.

7. The method of claim 5 wherein the group IP addresses corresponding respectively to the source IP address and destination IP address are the same.

8. A method of groupcasting implemented by a user equipment, UE, configured for device-to-device, D2D, communication, comprising:
    obtaining group information of a device group, the group information including a first group identifier for the device group as a destination layer 2, L2, identifier and a second group identifier for the device group as the source L2 identifier for the groupcast message; and
    receiving a groupcast message from a members of a device group including the UE, the groupcast message including the first group identifier for the device group as the destination L2 identifier of the groupcast message and the second group identifier for the device group as the source L2 identifier for the groupcast message.

9. The method of claim 8 wherein the first group identifier and the second group identifier for the device group are the same.

10. The method of claim 8 wherein the groupcast message further comprises an application identifier that identifies a source of the groupcast message.

11. The method of claim 10 wherein the application identifier is encrypted and further comprising decrypting the application identifier prior to sending the groupcast message.

12. The method of claim 8 wherein the groupcast message further comprises a source Internet protocol, IP, address and a destination IP address.

13. The method of claim 12 wherein the source IP address and destination IP address comprise group IP addresses.

14. The method of claim 13 wherein the group IP addresses corresponding respectively to the source IP address and destination IP address are the same.

15. A user equipment, UE, configured for group communication over a sidelink, the UE comprising:
    communication circuitry configured for group communication over a side link; and
    processing circuitry configured to:
        obtain group information of a device group, the group information including a first group identifier for the device group as a destination layer 2, L2, identifier and a second group identifier for the device group as the source L2 identifier for the groupcast message; and
        send a groupcast message to members of a device group including the UE, the groupcast message including the first group identifier for the device group as the destination L2 identifier of the groupcast message and the second group identifier for the device group as the source L2 identifier for the groupcast message.

16. A user equipment (UE) configured for group communication over a sidelink, the UE comprising:
    communication circuitry configured for group communication over a sidelink; and
    processing circuitry configured to:
        obtain group information of a device group, the group information including a first group identifier for the device group as a destination layer 2, L2, identifier and a second group identifier for the device group as the source L2 identifier for the groupcast message; and
        receive a groupcast message from a members of a device group including the UE, the groupcast message including the first group identifier for the device group as the destination L2 identifier of the groupcast message and the second group identifier for the device group as the source L2 identifier for the groupcast message.

17. The UE of claim 15 wherein the groupcast message further comprises an application identifier that identifies a source of the groupcast message.

18. The UE of claim 17 further comprising encrypting the application identifier prior to sending the groupcast message.

19. The UE of claim 16 wherein the groupcast message further comprises an application identifier that identifies a source of the groupcast message.

20. The UE of claim 19 further comprising encrypting the application identifier prior to sending the groupcast message.

* * * * *